United States Patent [19]

McClaren

[11] 4,330,232
[45] May 18, 1982

[54] GRAIN BIN AND TRUCK LOADING AND UNLOADING SYSTEM

[76] Inventor: Jay L. McClaren, Dassel, Minn. 55325

[21] Appl. No.: 191,610

[22] Filed: Sep. 29, 1980

Related U.S. Application Data

[63] Continuation of Ser. No. 921,722, Jul. 3, 1978, abandoned.

[51] Int. Cl.³ .................. B65G 65/22; B65G 65/28
[52] U.S. Cl. ............................. 414/267; 414/268; 198/306; 198/587
[58] Field of Search ............... 414/267, 326, 268, 269, 414/287; 198/303, 306, 314, 317, 587, 668

[56] References Cited

U.S. PATENT DOCUMENTS

| | | | |
|---|---|---|---|
| 2,918,185 | 12/1959 | Farnham et al. | 414/269 |
| 3,197,044 | 7/1965 | Hozak | 414/268 |
| 3,198,313 | 8/1965 | Long | 414/269 X |
| 3,406,809 | 10/1968 | Mayrath | 198/587 |
| 4,004,351 | 1/1977 | Sanneman | 414/287 X |
| 4,054,213 | 10/1977 | Chever | 198/306 |

FOREIGN PATENT DOCUMENTS 1321950  2/1963  France .................. 198/587

Primary Examiner—George E. A. Halvosa
Assistant Examiner—L. E. Williams
Attorney, Agent, or Firm—H. Dale Palmatier

[57] ABSTRACT

A grain handling transfer and storing system including a plurality of bins in two rows in circular arcs about a center pad, each of the bins or receptacles having ground level discharging conveyors and open tops for filling, a pair of screw conveyors radially arranged from the center of the open space between the bins, with distal ends supported on wheeled carriages and proximal ends on a swiveling mounting carried by a tripod and a swiveling housing permitting swinging of the screw conveyors.

7 Claims, 5 Drawing Figures

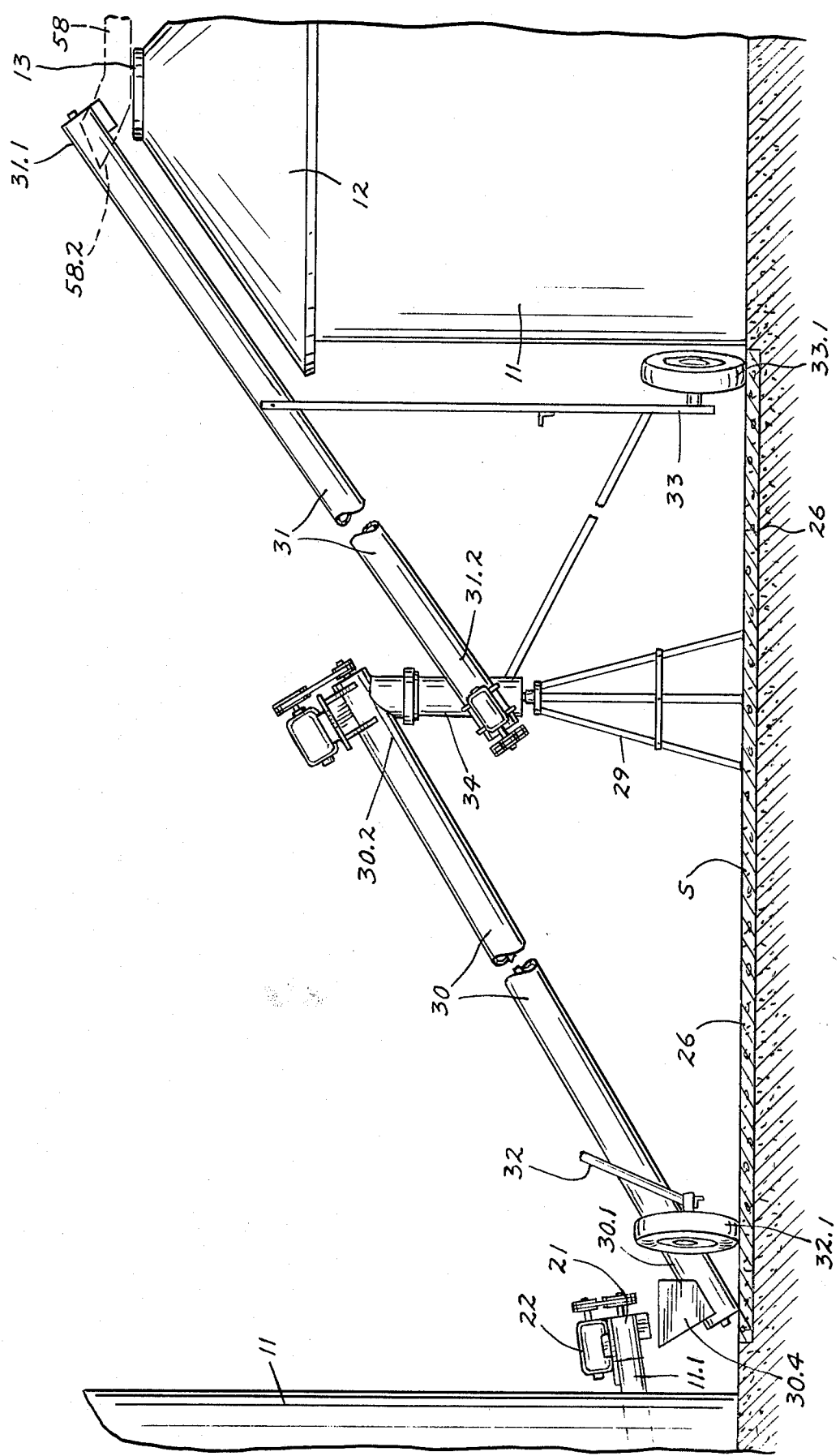

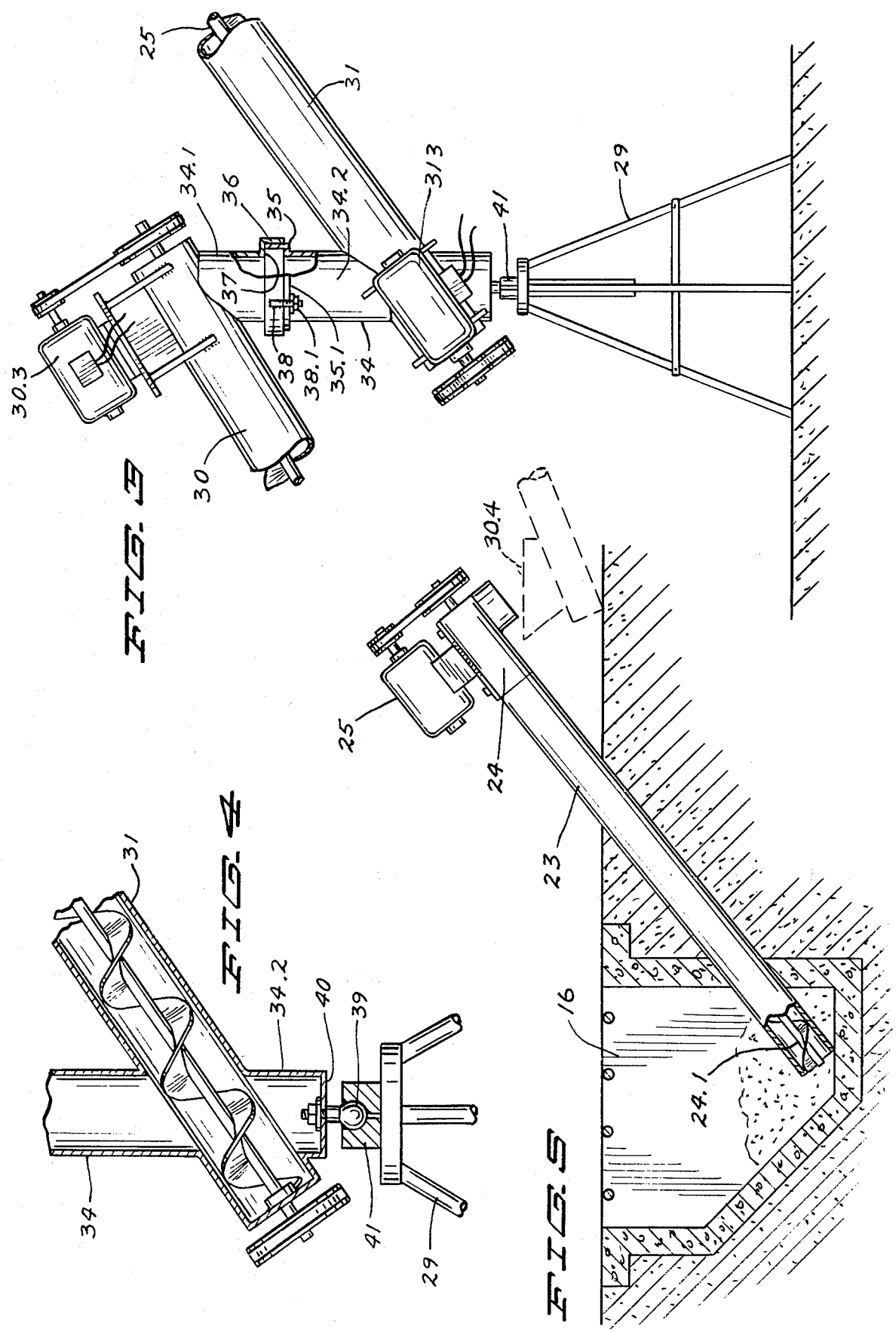

GRAIN BIN AND TRUCK LOADING AND UNLOADING SYSTEM

This application is a continuation of application Ser. No. 921,722, filed July 3, 1978, now abandoned.

This invention relates to a grain handling transfer and storing system and including a two stage grain elevating and conveying apparatus.

BACKGROUND OF THE INVENTION

Storing of grain on a farm or ranch requires a number of bins or storage receptacles. In the past, the loading and unloading of the bins or receptacles has been accomplished with considerable difficulty or expense. Elaborate systems of permanently installed elevating and delivery screw conveyors have been installed, but previously no simple, easily operable and flexible handling system has been available.

Various devices have been used for collecting or removing grain from bins, or siloes, such as illustrated in U.S. Pat. Nos. 2,298,332; 2,794,560; and 2,615,594.

Some shifting of grain from especially devised bins is accomplished by conveyors of the type illustrated in U.S. Pat. No. 3,197,046 using a central mast confined under an air supported fabric roof. However, this arrangement cannot be utilized on most farms and is cumbersome and inconvenient to use.

SUMMARY OF THE INVENTION

The present invention has a number of grain storage receptacles arranged along a circular arc about an open center space. Certain of the receptacles may be conventional grain storage bins, and others of the receptacles may be a grain dryer, or a dump pit, or a receptacle body of a truck or car used to haul grain. The center space has a tripod at the center for supporting a housing by which the proximal ends of two different screw conveyors are connected together and allowed to swing about a vertical axis at the center of the open space. The outer ends of the two screw conveyors are carried on ground engaging wheeled carriages. The distal end of one of the screw conveyors is elevated and extended outwardly beyond the open space so as to extend above the receptacles for delivering grain into the open top of one of the receptacles.

The distal end of the other screw conveyor is supported by its wheeled carriage at or close to ground level so that its receiving hopper can accept grain from the emptying apparatus of one or more of the receptacles for delivering the grain and elevating it to one of the other receptacles.

It will be recognized that the grain bins or receptacles may be tightly clustered on a circular arc concentric of the center of the tripod so that a maximum number of receptacles can be serviced by this single simple apparatus.

A second ring of bins or receptacles may be positioned outwardly from the first ring of bins and separated therefrom by another track, along which another wheeled carriage may travel to locate an elevated screw conveyor for carrying grain from the elevated end of one of the other screw conveyors to the second ring of bins.

BRIEF DESCRIPTION OF THE DRAWINGS

FIG. 2 is an elevation view of the loading and unloading apparatus.

FIG. 3 is an enlarged detail elevation view of the central support assembly.

FIG. 4 is an enlarged detail section of the center housing as it is supported by the tripod.

FIG. 5 is a section through the below ground pit.

DETAILED SPECIFICATION

Figure 1:
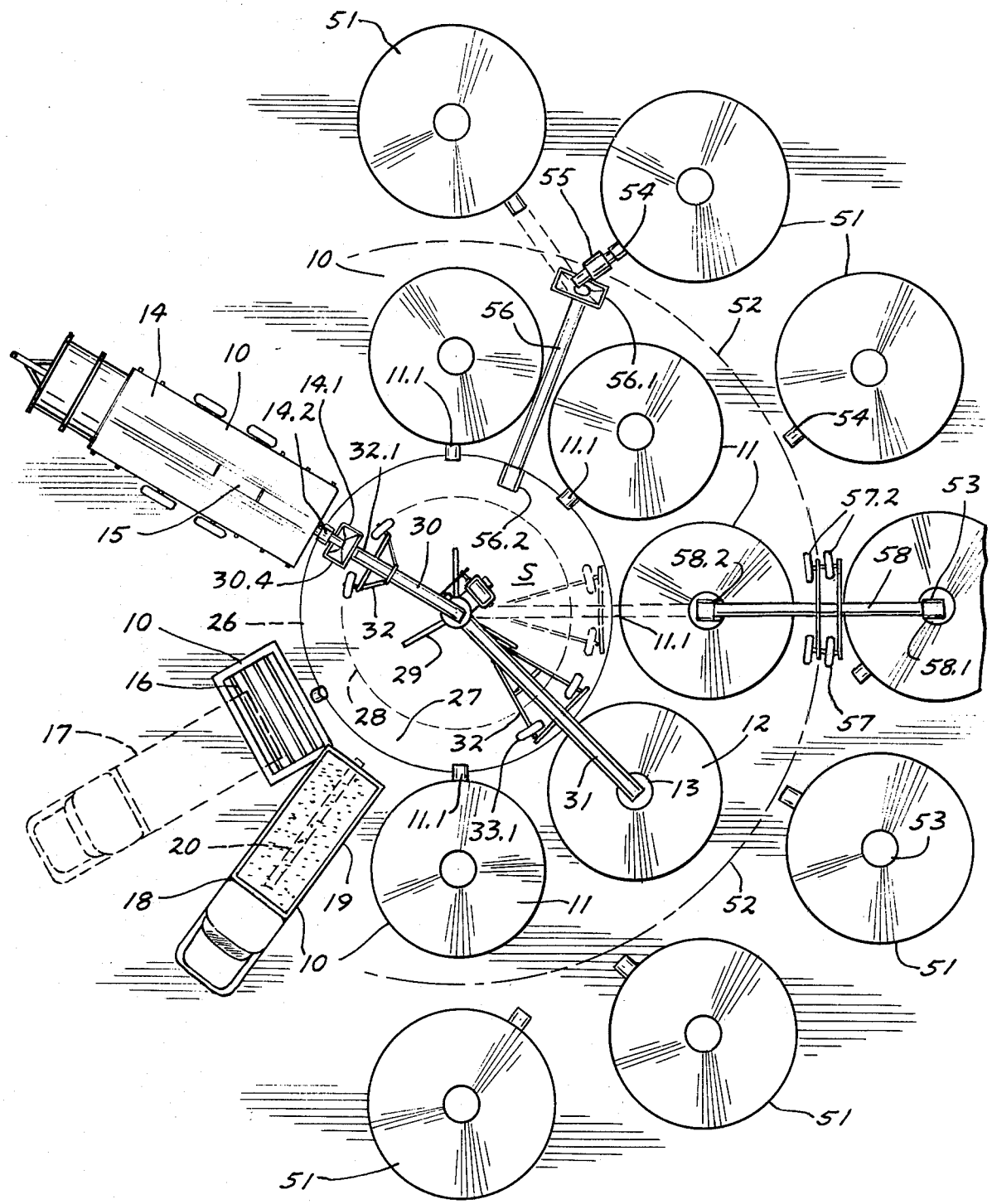
FIG. 1 is a top plan view of the system and loading and unloading apparatus.

One form of the invention is illustrated in the drawings and is described herein.

The drawings illustrate a plurality of receptacles 10 clustered around an open space S. Certain of the open topped grain storage receptacles 10 are conventional grain bins 11 which have a generally circular and slanted roof 12 with a large access opening 13 into which grain is supplied. The access opening 13 is conventionally closed after the bin has been filled with a weathertight cap or cover. Alternately, one or more of the receptacles may comprise a grain dryer 14 located adjacent the open space S and having an access opening 15 in its top into which grain may be delivered for drying. Another of the receptacles may be an open topped pit 16 at ground level into which grain may be dumped from a truck 17 for transfer into one of the bins 11. Additionally, it will be recognized that there is space adjacent the open space S for a truck 18 having an open topped truck body 19 to be loaded with grain from one of the bins 11. Whereas it is contemplated that in some situations the trucks 17 will dump their loads into the pit for transfer to the bins, a truck may also incorporate a screw conveyor 20 by which the receptacle or truck body 19 may be unloaded.

Each of the bins 11 may be provided with means adjacent ground level to accommodate unloading of the bin. Such unloading devices may take any of a number of forms, but a common simple form is a short length of tubing 11.1 opening to the interior of the bin and adapted to receive a demountable screw conveyor 21 as illustrated in FIG. 2, the auger of which may be inserted through the tube 11.1 and into the bottom of the bin for augering grain from the bin. The screw conveyor 21 may carry its own electric motor 22 for turning the auger of the screw conveyor.

Similarly, the grain dryer 14 will incorporate a grain loading means adjacent ground level, such as a screw conveyor 14.1 drawing grain from the full length of the dryer after the grain has been dried. The grain discharging screw conveyor 14.1 of the dryer may carry its own electric motor 14.2 for turning the auger of the screw conveyor.

In a similar way, the loading pit 16 may incorporate a permanently located unloading tube 23 into which a demountable screw conveyor 24 having its own motor 25 may be mounted. The auger 24.1 of the screw conveyor 24 will extend through the tube into the bottom of the pit for unloading grain that is dumped into the pit. The screw conveyor 24 has its discharge adjacent the ground level, somewhat similar to the other emptying means of the other types of receptacles.

It will be recognized that all of the receptacles, including the bins 11, pit 16, truck 18, and dryer 14, are all arranged adjacent each other in a circular arc about the center of the open space S. The open space S may be covered with a concrete pad 26 to provide substantially smooth, circular tracks 27 and 28 concentric of the center of a support tripod 29 carried by the concrete pad. The tripod 29 serves to support the inner or proximal ends of two different elevating screw conveyors 30 and 31. The tripod 29 is located at the center of the open space and pad 26 and defines a vertical axis about which the two screw conveyors 30 and 31 may swing.

The outer or distal ends of the screw conveyors 30 and 31 are supported by ground engaging wheeled support carriages 32 and 33 so that the distal end 30.1 of the lower screw conveyor will be disposed adjacent ground level, and the grain discharging distal end 31.1 of the upper screw conveyor 31 will be located in elevated position over the several receptacles 10 including bins 11. The carriages 32 and 33 incorporate rigid frame elements affixed to the auger tubes of the screw conveyors 30 and 31. The carriages 32 and 33 also incorporate rubber tired ground engaging wheels 32.1 and 33.1 rotating on horizontal axes which are oriented so that the wheels will follow the tracks 27 and 28 on the concrete pad. The tracks 27 and 28 are not represented by any physical structure, but only designate the circular courses which will be followed by the wheeled carriages.

It will be recognized that both of the carriages 32 and 33 have a pair of such wheels 32.1 and 33.1 so that the screw conveyors 30 and 31 will be maintained in proper orientation and may be easily swung to various positions about the vertical axis which extends through the center of tripod 29.

The proximal end 30.2 of the lower screw conveyor 30 and the proximal end 31.2 of the upper screw conveyor 31 are both connected to a two part transfer housing 34 which is generally cylindrical in shape and provides grain flow communication between the proximal ends of the two screw conveyors. It will be recognized that the proximal end of screw conveyor 30 is disposed above or in superposed relation with respect to the proximal end of the screw conveyor 31 so that grain being discharged from conveyor 30 will fall by gravity through the housing 34 to be received by the auger of screw conveyor 31.

The two part housing 34 serves to support the proximal ends of the two screw conveyors 30 and 31 from the tripod, and the two parts or upper or lower wall sections 34.1 and 34.2 of the two part housing are adapted to rotate with respect to each other and about their common concentric axis and relative to each other as to permit the two screw conveyors 30 and 31 to swing about the vertical axis to various locations. The lower part 34.2 of the housing has an upright annular flange 35 which fits snugly into a depending annular flange 36 which is rigid with the upper part 34.1 of the housing. The upper flange 36 defines an interior shoulder surface 37 which bears against the upper end edge of flange 35 to be supported thereon.

The two part housing 34 is retained together by a plurality of upright threaded lugs 38 spaced about the periphery of flange 36 and welded thereto. A nut and washer 38.1 on the threaded stud 38 bears upwardly against the shoulder 35.1 of the lower housing part and retains the two parts of the housing together, while permitting relative rotation of the two parts of the housing about the vertical concentric axis.

A rigid ball coupling 39 is affixed to the lower end plate 40 of the lower housing part 34.2 and is received and captured in an openable socket 41 on the top of tripod 29 for accurately locating the housing 34 and screw conveyors 30 and 31 at the vertical axis of the tripod 29. The openable socket 41 may have its two parts hinged and then retained together by a suitable latch for retaining the ball 39 in predetermined position. Alternately, the swiveling connection between the housing 34 and tripod 29 may be simply concentric telescoping cylindrical parts to properly center the housing 34 above the tripod while allowing ready disconnection by merely lifting the housing 34 off the tripod.

The screw conveyors 30 and 31 each has a separate electric motor 30.3 and 31.3 for turning the augers of the screw conveyor.

In the position of the apparatus illustrated in FIG. 1, the grain receiving hopper 30.4 at the distal end of conveyor 30 is disposed adjacent the dryer 14 as to receive dried grain from the discharging screw conveyor 14.1.

On the other hand, in FIG. 2, the lower screw conveyor 30 has been swung around to receive grain from the discharging screw conveyor 21 of one of the grain bins 11, thus illustrating the flexibility of this apparatus for changing grain from one bin or device to another.

In both of FIGS. 1 and 2, the upper screw conveyor 31 is swung to a position above one of the grain bins 11 for discharging grain from the upper distal end 31.1 into the opening 31 at the top of the bin.

Also, according to the present invention, a second ring of receptacles or bins 51 is arranged in a circularly arcuate pattern concentric of the axis at the center of tripod 29. The second ring of bins 51 is spaced outwardly from bins 11 so as to leave room for a second track 52 on the ground between the two rings of bins. Each of the bins also has a top opening 53 which is normally covered by a cap; and each of the bins 51 has a similar emptying means such as tubes 54 which are disposed adjacent the ground level to receive a portable grain auger such as indicated at 55 for withdrawing grain from the bin. The bin emptying screw conveyor 55 may be used with another screw conveyor 56 lying on the ground such that its receiving hopper 56.1 receives grain from the screw conveyor 55 and having its discharge end 56.2 located so that the hopper 30.4 may be swung around and positioned beneath the end of auger 56 to receive the grain therefrom.

A third ground engaging wheeled support carriage 57 moves along the track 52 between the bins 51 and bins 11 and supports an elevated screw conveyor 58 located adjacent the tops of the bins 11. Screw conveyor 58 has its own motor 58.1 for turning it auger. The discharge end of the screw conveyor 58 may be positioned over one of the filling openings 53 of one of the bins 51. The receiving end 58.2 of the screw conveyor 58 has a suitable shape for coupling with the distal discharging end 31.1 of screw conveyor 31 to receive the grain therefrom to provide for conveying the grain substantially horizontally to the outer ring of bins 51. The inner end of screw conveyor 58 is illustrated in FIG. 2. The wheeled carriage 57 has a number of rubber tired wheels 57.1 to properly support and balance the elevated screw conveyor 58 so that it may travel to any of a number of locations along the track 52. It should be recognized that when the elevating screw conveyor 31 is coupled with the conveyor 58, substantially in the manner illustrated in FIG. 2, it is not required that the screw conveyor 31 be oriented with its distal end directly over one of the openings 13 of one of the bins 11.

By using the screw conveyor 58, the outer ring of bins 51 may be filled, and by using the emptying screw conveyor 55 and the ground level transport screw conveyor 56, the grain from the outer ring of bins 51 may be transported back to the central elevating apparatus including conveyors 30 and 31 so that the grain from any of these bins may be transferred to any other receptacle.

It will be seen that I have provided a new and improved grain handling transfer and storing system wherein a number of grain bins may be clustered around a center grain handling system, the two stage elevating screw conveyors of which are supported on wheeled carriages so that they may be swung about a vertical axis and supported also by a center tripod at the axis. The entire grain handling and moving system, and especially the screw conveyors 30 and 31, may be readily demounted by removing from the tripod and stored out of the weather during off seasons of non-use. The same handling system may be used for a number of different clusters of bins. Grain from a number of concentric rows of bins in circular arcs may be handled by the same conveying system.

What is claimed is:

1. A grain handling apparatus for loading and unloading grain bins and receptacles and the like, comprising a grain receiving screw conveyor and a grain discharging screw conveyor, said conveyors being inclined at a steep angle to the horizontal said conveyors having inner ends adjacent each other and also having outer ends, the outer end of the grain receiving screw conveyor having a hopper thereon, a stationary center support on the ground and beneath the inner ends of both of said conveyors, an enclosed transfer housing above said center support and having upper and lower upright peripheral wall sections with rotatable connector means therebetween maintaining the wall sections in substantial alignment with each other and permitting rotation of said wall sections relative to each other and about an upright rotation axis extending through the housing, rotatable mounting means beneath the transfer housing and secured to the center support and permitting turning of the lower wall section about an upright turning axis, the inner end of the receiving screw conveyor being disposed above the inner end of the discharging screw conveyor and traversing the upper wall section of the transfer housing in fixed grain flow communication to deliver grain into the housing, the inner end of the discharging screw conveyor traversing the lower wall section of the transfer housing in fixed grain flow communication to receive grain therefrom, a first pair of ground travel support wheels in tandem relation to each other adjacent the outer end of the receiving screw conveyor, attaching means on the receiving screw conveyor and mounting said support wheels to locate the outer end of the receiving screw conveyor and the hopper adjacent ground level, the support wheels being oriented to follow a circular track around the stationary support, and a second pair of ground travel support wheels in tandem relation to each other beneath the discharging screw conveyor, rigid bracket means affixed to the discharging screw conveyor intermediate the inner and outer ends thereof, and said bracket means mounting said second support wheels and supporting the outer end of the discharging conveyor at a height significantly above the inner end of the receiving conveyor, the second support wheels being oriented to follow the circular track around the stationary support, the outer end of the discharging screw conveyor projecting significantly beyond the bracket means.

2. The grain handling apparatus according to claim 1 and the discharging screw conveyor having a screw auger extending into the transfer housing and the conveyor also having an auger tube affixed to and cooperating with the lower wall section to enclose the interior of the housing.

3. The grain handling apparatus according to claim 2 and the screw auger traversing the rotation axis through the transfer housing.

4. The grain handling apparatus according to claim 1 and the receiving screw conveyor having a auger tube traversing the upper wall section at the top of the transfer housing and substantially on a radius relative to said rotation axis to enclose the transfer housing.

5. The grain handling apparatus according to claim 1 and the center support being a portable tripod, the orientation of both first and second support wheels permitting travel of the screw conveyors around the circular track without moving the tripod.

6. The grain handling apparatus according to claim 1 wherein each of said screw conveyors has an electric motor mounted on the inner end thereof adjacent the transfer housing.

7. The grain handling apparatus according to claim 1 and including a supply screw conveyor adjacent said circular track and having a discharge end disposed above the hopper of the receiving screw conveyor for delivering grain into the hopper for transfer through the receiving and discharge screw conveyors.

* * * * *